Figure 1:
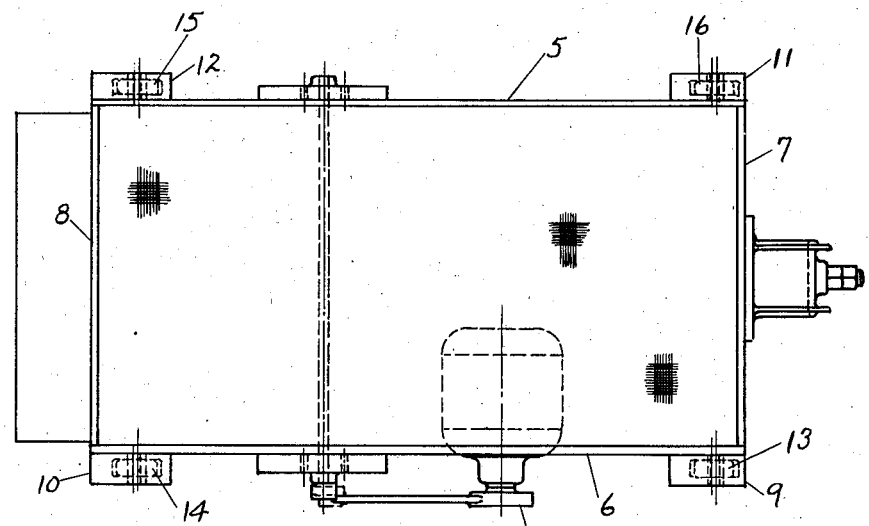

Feb. 27, 1940.　　　E. W. SMITH　　　2,191,504
VIBRATIONAL MACHINERY
Filed Nov. 23, 1936　　　2 Sheets-Sheet 1

INVENTOR.
Edward W. Smith
BY Ezekiel Wolf
his ATTORNEY.

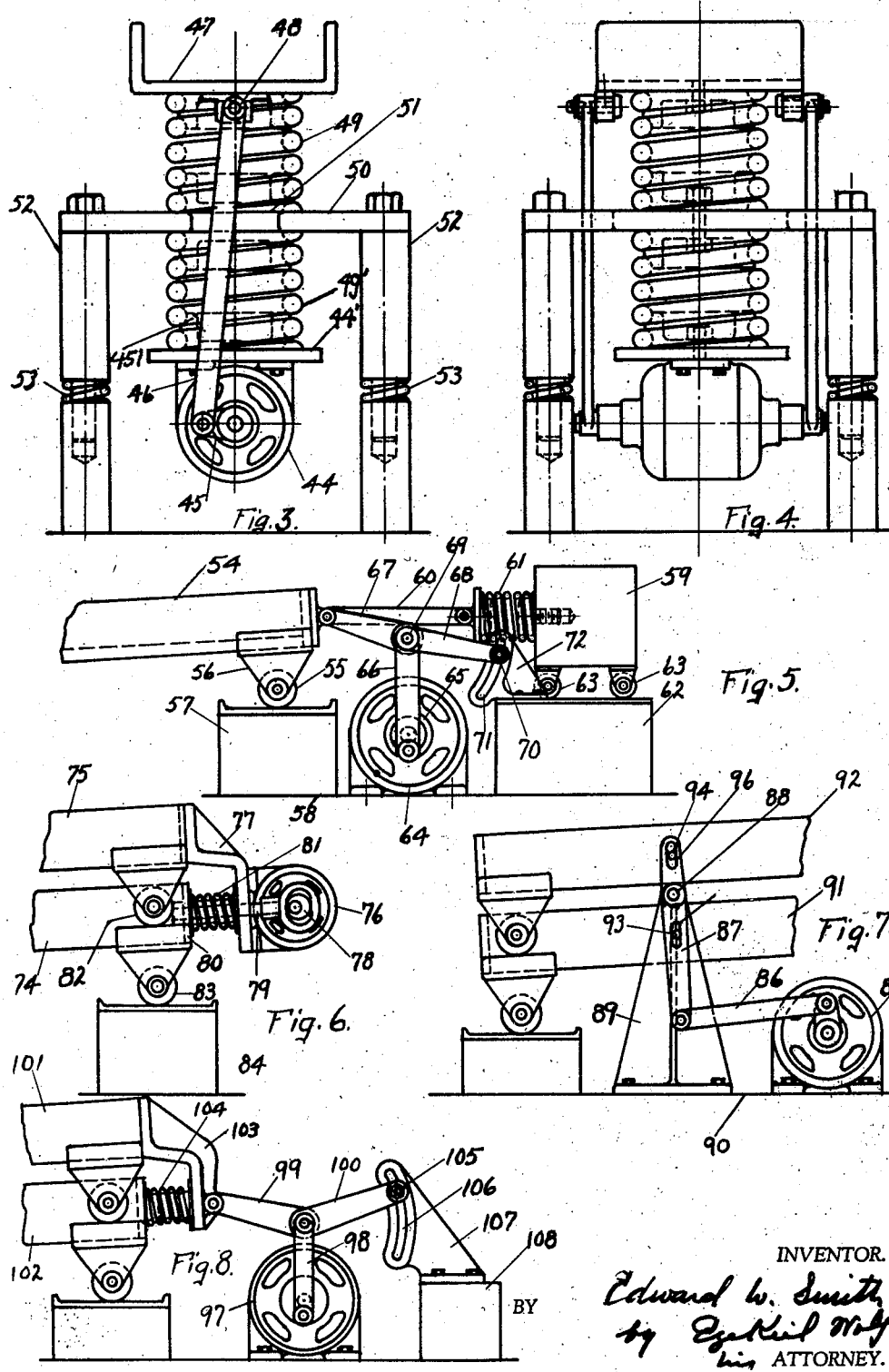

Patented Feb. 27, 1940

2,191,504

UNITED STATES PATENT OFFICE 2,191,504

VIBRATIONAL MACHINERY

Edward W. Smith, Melrose, Mass., assignor to Submarine Signal Company, Boston, Mass., a corporation of Maine Application November 23, 1936, Serial No. 112,250

5 Claims. (Cl. 209—365)

The present invention relates to vibrational machinery and more particularly to sifting machinery. It may also be applied to vibration of screens or tables through which material is either separated or graded or, in fact, to any type of machinery where a flat surface is to be vibrated rapidly and with a considerable amplitude.

In the present invention the vibrations of the screen or material to be shaken is established by means of a resonant system comprising two masses coupled by an elastic element to which vibrational energy is applied either by applying it to one mass or between the two masses.

In the present invention the system may be formed either of a single screen to which is coupled through an elastic element a mass of substantial size or to a double screen system in which two screens are coupled together by a spring coupling element, the vibrations in this case being applied either to one of the screens or between the two screens.

In machinery of the prior art it has been customary to vibrate the screen or table by directly coupling the screen or the table to a motor which oscillates the table and thereby produces the desired vibrations. Sometimes where the oscillatory motion works to force the table only in one direction, a spring is used to restore it in its normal position. This spring is usually placed between the table and the floor foundation and is compressed when the table is pulled in one direction and released when the table is again free.

In this mechanism the forces that move the table act directly upon the floor foundation and thereby create considerable vibration of the floor and its foundation. If the building structures are not constructed in such a way as to allow for this continued vibration, their safety may be seriously impaired. In addition to this, the vibration of the floor and foundation makes working conditions more difficult and may seriously interfere or hamper operations in other parts of the building. The present invention corrects this difficulty in that it supplies vibrational forces to the sifting machinery, or the like, without seriously vibrating the floor supports or transmitting vibrations to the floor itself.

In the preferred form the mechanical energy and mechanical forces are applied between two vibratory elements forming the vibrating system of which the sifting screen is a part. The forces may be applied between two sifting screens or between the sifting screen and a balanced load. As a modification of this arrangement the force may be applied simultaneously to both elements of the vibrating system, but in opposite directions with the result that the resultant force applied to the system is distributed over a considerable amplitude of motion. In this way it is also possible to reduce the vibrations applied to the floor or foundation of the building and therefore to effect the results previously described.

As a further feature of the present invention the masses assigned to each vibratory element should be of such a magnitude that the variations occurring in the system due to the loading and unloading of the screens will not substantially affect the resonance or amplitude of the screen itself. The system may also be designed in such a manner as to produce the desired motional amplitude.

Figure 2:
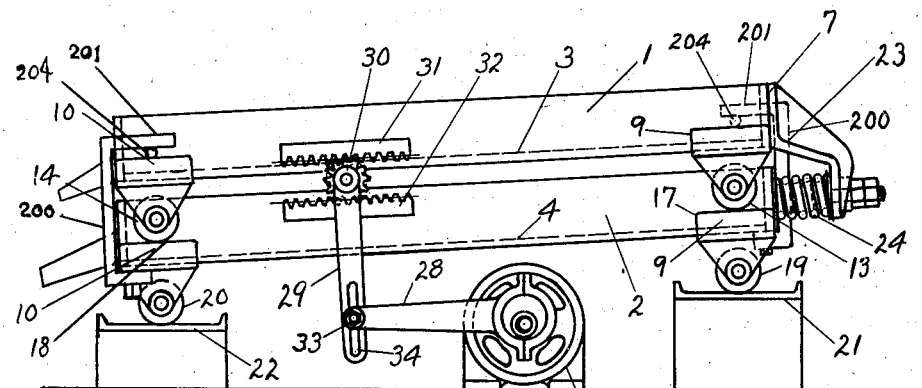
Figure 2A:
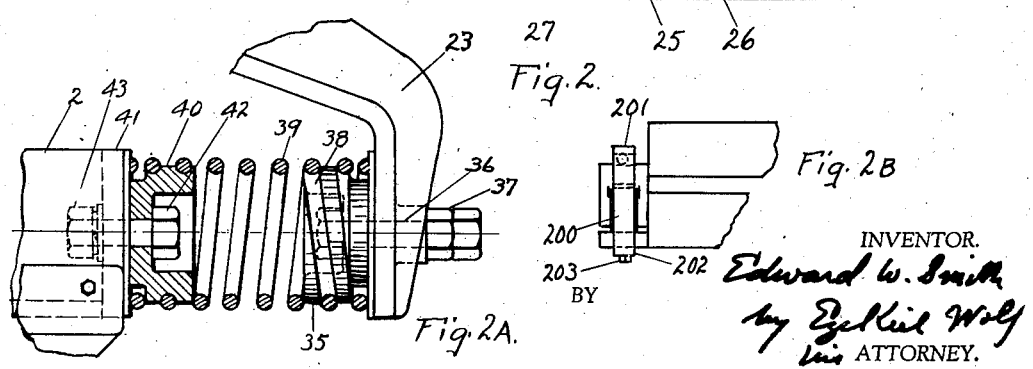
Figure 2B:
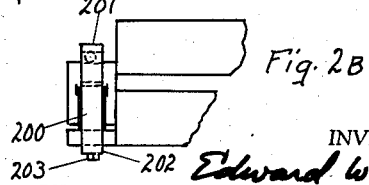

The other advantages will appear from the description given below in connection with the drawings showing the application of the invention in which Fig. 1 shows a plan view of the device as applied to a sifting screen; Fig. 2 shows a side elevation of the view shown in Fig. 1; Fig. 2a is a detail of an element shown in Figs. 1 and 2; Fig. 2b shows another end view of Figs. 1 and 2 showing a further detail; Fig. 3 shows an elevation of a modification of the device of Figs. 1 and 2; Fig. 4 shows an elevation of the device shown in Fig. 3 looking from the side; Fig. 5 shows a further modification of the application of the invention to a single screen; Fig. 6 shows a still further modification of the device shown in Figs. 1 and 2; and Figs. 7 and 8 show still further modifications of the device shown in Figs. 1 and 2.

The embodiments of Figs. 1 and 2 have two screen frames 1 and 2 at the bottom of which are positioned the screens 3 and 4. The frames 1 and 2 may have side and end retaining walls 5, 6, 7 and 8, respectively, and are also provided with supports 9, 10, 11 and 12 for supporting the wheels 13, 14, 15 and 16. The lower frame 2 may also be provided with plates 17 and 18, as shown in Fig. 2, upon which the wheels 13 and 14 are free to move. These plates extend from the side of the lower frame and furnish a free rolling support for the top frame. The top frame with the material on the screen bearing down upon it or even without this material is usually heavy enough to keep the wheels firmly on the plate. However, there is provided, as indicated in Fig. 2b, means for holding the top frame on the lower one. This comprises a C-shaped member having an upright element 200 and two horizontal elements, the element 202 being attached to the lower support 9 by the bolt 203 and the upper element 201 extending over the support 9 and bearing upon it through the roller bearing 204.

The lower frame 2 is also provided with wheels or trucks 19, 20, etc., which rest upon the plates 21 and 22 and upon which the lower trucks roll freely back and forth. Extending from the rear wall 7 of the top frame is a reinforced bracket 23 to which the spring 24 is attached by the means indicated more clearly in Fig. 2a.

In the arrangement shown in Figs. 1 and 2 the vibrations are applied through the motor 25 which may be installed on the floor 26. The motor 25 drives at one end an eccentric 27, which turns a crank arm 28 to which is connected a link or lever 29. The lever 29 carries at one end a pinion gear 30 which engages with two racks 31 and 32, the rack 31 being attached to the top frame and the rack 32 to the lower frame. The crank arm 28 is attached to the lever 29 by means of a rod 33 engaging in a slot 34 in the lever 29.

The mechanism, elastically coupling the two frames together, which is indicated more clearly in Fig. 2a, comprises the brace 23 to which a core element 35 is attached by means of the bolt 36 and nut 37. This core element is threaded as indicated at 38 to receive the spring 39 which is threaded into it. The other end of the spring 39 is likewise attached to the frame 2. A similar core 40 in this case is bolted to the back board 41 of the lower frame by means of the bolt 42 and nut 43. The spring 39 similarly threads onto the core 40 so that outside of the driving means the only coupling element between the upper and lower screen is provided by means of the spring 39. The system in this manner is formed as a vibratory system and has a frequency of resonance determined by the following formula:

$$f = \frac{1}{2\pi}\sqrt{\frac{\mu}{m}}$$

where $f$ equals the resonant frequency in cycles per second, $\mu$ the restoring force or elasticity and $m$ the effective mass. The effective mass of the system just described is equal to the product of the masses divided by their sum. In the present case where a helical spring is used, the strength of the spring required to give resonance to the system at some particular frequency may be determined by the determination of $\mu$ in the following equation:

$$\mu = (2\pi f)^2 \frac{m_1 m_2}{m_1 + m_2}$$

or $$\mu = 4\pi^2 f^2 \frac{m_1 m_2}{m_1 + m_2}$$

where $\mu$ is defined as the strength of the spring required expressed in dynes per centimeter of deflection, and $m_1$ and $m_2$ are the weights of the bodies in grams and $f$ is the number of vibrations per second. The total length of the spring can thus be determined by knowing the strength required and the maximum stroke which is the sum of the individual movement from the center of each of the masses concerned. Where the masses are divided and made equal, equal amplitudes of motion are obtained. When these masses are changed, the amplitudes vary inversely in the same manner so that for a system having two masses the larger mass has proportionately the smaller amplitude. This feature may be used in the design of the present vibratory system by so balancing the masses of each frame as to provide the desired amplitude or amplitude ratio. Removable masses may be provided which can be added to one frame or the other to change the amplitude of motion as may be desired for the purpose for which the device is used.

In the mechanism shown in Figs. 3 and 4 a method is shown for vibrating a container or screen vertically, following the same principles as shown in the other figures. In this particular case the mechanical force is applied by the motor 44 driving an eccentric 45 which is linked by the link 46 to the screen or container 47 by the pivot 48. The motor 44 is supported on a plate 44' attached to the spring 49' through the threaded collar 451 into which the spring 49' is screwed. Similarly, the spring 49 supports at its top end the container 47. The other ends of the springs 49 and 49' are threaded into a central collar 51 formed as a part of the plate 50 or fastened to it in any suitable manner.

The spring 49 is fixed rigidly in position by means of the frame 51 to which the spring is threaded. The plate 50 may be supported by upright supports 52, 52 in which spring elements 53 may be placed to take up whatever unbalancing may occur in the system. However, it is to be noted that when the system is properly balanced, the external supports will not be subject to vibration. The link 46 driven by the motor 44 alternately acts to draw the motor and screen together and then to repel them. This sets up vibrations or oscillations in the system to which the spring element is proportioned to establish a resonant system so that there is a complete transfer of energy to the vibrating mass, and no or very little vibration or motion is given to the external supports. At the resonant frequency of the system it is also possible to obtain the greatest amplitude of motion with the least driving force.

In Fig. 5 a system in which a single frame or screen is employed is shown. Here the frame 35 or screen 54 is supported as indicated for the lower screen in Fig. 2. The wheels 55 supported through the supporting legs 56 are free to move on the base 57 mounted on the floor 58. Coupled to the frame or screen 54 is the mass 59 through the link 60 and the elastic coupling 61 in an arrangement similar to that shown in Fig. 2a. The mass 59 is free to move back and forth on the base 62, the mass itself being supported by the wheels 63 hung from the lower part of the mass itself. The frame 54 is driven by means of the motor 64 through the eccentric 65 and the link arms 66 and 67. The links 66 and 67 are linked together with a third link 68 at a common center 69, the third link 68 having the other end adjustably fixed by means of the lock bolt and nut 70 in an arcuate slot 71 in the supporting frame 72 attached to the base 62. Adjusting the position of the end of the link 68 in the arcuate slot 71 controls the amplitude of motion of the frame 54. In Fig. 5 the mass 59 may be replaced by any other vibrating element as, for instance, another frame 54 or some container or the like. The mass 59 may also be adjustable, if desired, to adjust for resonance and maximum vibration of the system.

In Fig. 6 a system similar to that shown in Figs. 1 and 2 is indicated. Here, however, the frames or screens 74 and 75 have the driving mechanism mounted to apply the forces differentially at the ends of the frames. This is accomplished by mounting the motor 76 at the end of the supporting bracket 7 attached to the top frame 75 and coupling the motor drive directly to the lower frame by means of the eccentric 78 and the crank shaft 79 which is attached to the end 80 of the lower frame 74. An elastic coupling in the form of a helical spring 81 may be placed between the supporting frame 77 and the lower screen 74 as indicated in the figure. The two frames or screens 74 and 75 rest freely on the wheels 82 and 83, the lower wheels 83 resting on the base 84.

In Fig. 7 a further modification of the device in Figs. 1 and 2 is indicated. Here the driving motor 85 drives a shaft 86 which is coupled to the lower end of a lever 87 pivoted at 88 in a supporting frame 89 supported to the base 90 on which the motor itself is mounted. The lever 87 oscillates back and forth carrying the screens or frames 91 and 92 which have projecting arms or shafts 93 and 94, respectively, working in slots 95 and 96 in the arm 87. In the modification shown in this figure a similar coupling means is used as indicated in the other figures, the difference in this case being in the driving system by which the point of pivot 88 of the arm 87 is fixed.

In Fig. 8 a still further modification of the arrangement shown in Figs. 1 and 2 is shown. Here, the driving arrangement is the same as that indicated in Fig. 5 with the motor 97 driving the crank 98 which is linked to the arms 99 and 100. The arm 99 drives the entire system comprising the frames 101 and 102 joined together by means of the support 103 and the spring coupling element 104. In this case the link 99 links to the support 103 and imparts its vibration to the system as a whole. The link 100 has its end 105 adjustable in the arcuate slot 106 of the frame 107 resting on the base 108.

In all of the embodiments shown in the present application the vibratory system is formed of masses coupled together by some elastic coupling element of relatively low mass. The masses may themselves be the screens and the load which they carry or they may be composed of a single screen coupled to a compensating mass by the elastic element. The mechanical energy for furnishing the motion may be supplied either between the vibratory masses or to one of the masses of the system. By providing two equal masses elastically coupled together, the amplitude of the masses may be made the same. If screens or containers of different masses are elastically coupled together, then the heavier mass will have the smaller amplitude of motion. Preferably the vibratory systems are run at resonance as this frequency produces the greatest possible amplitude of motion with a minimum of power consumption.

Having now described my invention, I claim:

1. A machine of the type described comprising two screens, means positioning said screens one above the other and allowing free motion in approximately a horizontal direction, means elastically coupling said screens together, a motor having an eccentric drive, a lever, means coupling said lever to said drive to provide an oscillation thereof, a gear forming the fulcrum of the lever and a pair of racks engaging said gear at points 180° apart on said gear, means mounting said racks respectively opposite one another on said screens.

2. A machine of the type described comprising a pair of screens positioned one over the other, the lower screen having a plurality of projecting supports projecting from the sides thereof, the upper screen having a plurality of rollers supporting it and positioned to move freely on said supports of the lower screen, a spring-coupling means coupling the ends of the screens together, said coupling means comprising a rigid support extending from the end of one screen to a position in line with the other screen and a helical spring fastened at one side to said supporting element and at the other side to means supported on the other screen.

3. A machine of the type described comprising a pair of screens positioned one over the other, the lower screen having a plurality of projecting supports projecting from the sides thereof, the upper screen having a plurality of rollers supporting it and positioned to move freely on said supports of the lower screen, a spring-coupling means coupling the ends of the screens together, said coupling means comprising a rigid support extending from the end of one screen to a position in line with the other screen and a helical spring fastened at one side to said supporting element and at the other side to means supported on the other screen, a pair of racks positioned one on each screen frame opposite each other, a gear engaging said racks at opposite sides of the gear, a lever having the same fulcrum as said gear and means for oscillating said lever to impart mechanical vibrations in opposite directions to said screen.

4. A machine of the type described comprising a pair of screens positioned one over the other, the lower screen having a plurality of projecting supports projecting from the sides thereof, the upper screen having a plurality of rollers supporting it and positioned to move freely on said supports of the lower screen, a spring-coupling means coupling the ends of the screens together, said coupling means comprising a rigid support extending from the end of one screen to a position in line with the other screen and a helical spring fastened at one side to said supporting element and at the other side to means supported on the other screen, a pair of racks positioned one on each screen frame opposite each other, a gear engaging said racks at opposite sides of the gear, a lever having the same fulcrum as said gear and means for oscillating said lever to impart mechanical vibrations in opposite directions to said screen, the elasticity of said spring and the masses of said screen being proportioned that for the frequency at which said oscillations of the motor occur the system will have a mechanical resonance.

5. A machine of the type described comprising a base, a pair of superposed screens mounted above said base, brackets on the lower of said screens bearing means at the lower end of said brackets engaging the base, said bearing means being constructed and arranged to support said lower screen on said base in such a manner as to permit horizontal movement of said screen relative to said base, bearing means on the upper of said screens engaging the upper ends of said brackets and thereby supporting said upper screen on said lower screen, said last named bearing means being so constructed and arranged as to permit horizontal movement of said upper screen relative to said lower screen, elastic coupling means independent of said bearing means, means mechanically coupling said coupling means between said screens and positioning said coupling means to permit the elastic forces thereof to act in a direction parallel to the oscillations of said screens and means acting between said screens for producing oscillations of said screens, said means adapted to produce said oscillations at the resonant frequency established by the masses and elasticity of the system.

EDWARD W. SMITH.